(12) United States Patent
Diehl et al.

(10) Patent No.: US 6,771,722 B2
(45) Date of Patent: *Aug. 3, 2004

(54) CHANNEL ESTIMATOR AND METHOD THEREFOR

(75) Inventors: John W. Diehl, Elmhurst, IL (US); Henry L. Kazecki, Arlington Heights, IL (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/126,618

(22) Filed: Jul. 31, 1998

(65) Prior Publication Data

US 2002/0196866 A1 Dec. 26, 2002

(51) Int. Cl.[7] .............................................. H04L 27/06
(52) U.S. Cl. ........................ 375/346; 375/232; 375/340
(58) Field of Search ................................ 375/232, 233, 375/254, 285, 346, 347, 348, 349, 340

(56) References Cited

U.S. PATENT DOCUMENTS

| | | | |
|---|---|---|---|
| 5,111,481 A | | 5/1992 | Chen et al. |
| 5,202,903 A | * | 4/1993 | Okanoue ..................... 375/347 |
| 5,303,263 A | * | 4/1994 | Shoji et al. .................. 375/229 |
| 5,432,816 A | | 7/1995 | Gozzo |
| 5,481,572 A | * | 1/1996 | Skold et al. ................. 375/347 |
| 5,481,656 A | | 1/1996 | Wakabayashi et al. |
| 5,513,215 A | * | 4/1996 | Marchetto et al. .......... 375/233 |
| 5,596,607 A | * | 1/1997 | Larsson et al. ............. 375/340 |
| 5,615,208 A | | 3/1997 | Hagmanns |
| 5,727,032 A | * | 3/1998 | Jamal et al. ................. 375/347 |
| 5,784,415 A | * | 7/1998 | Chevillat et al. ............. 360/65 |
| 5,818,876 A | | 10/1998 | Love |
| 5,887,035 A | * | 3/1999 | Molnar ........................ 375/340 |
| 6,021,161 A | * | 2/2000 | Yamaguchi et al. ........ 375/232 |
| 6,275,525 B1 | * | 8/2001 | Bahai et al. ................. 375/232 |

* cited by examiner

*Primary Examiner*—Young T. Tse
(74) *Attorney, Agent, or Firm*—Sylvia Y. Chen; Matthew C. Loppnow (57) ABSTRACT

In a radiotelephone (30), a channel estimator (39) receives a time division multiple access (TDMA) information signal (31) including a synchronous codeword (44), formed of a first subset of seven sequential symbols (47) followed by a second subset of seven sequential symbols (48), followed by a data sequence (45) formed of multiple sequential symbols. The channel estimator (39) uses the first subset (47) to train, via initializing (51) and updating (52), the channel estimator to stabilize the channel estimate. The channel estimator (39) uses the second subset (48) to train, via initializing (53) and updating (54), the predictor to improve the future accuracy of the channel estimate. The channel estimator (39) then tracks (55) the channel estimate over the data sequence (45) by updating the channel estimator and the predictor over the data sequence (45), without substantially affecting the stability of the channel estimate or the future accuracy of the channel estimate.

34 Claims, 4 Drawing Sheets

| PREDICTIVE LMS UPDATE EQUATIONS | |
|---|---|
| ERROR (70) | $e(n) = y(n) - \hat{H}(n\|n-1)X(n)$ |
| CHANNEL GRADIENT (71) | $E(n) = \mu e(n)\hat{X}^*(n)$ |
| RATE OF CHANGE OF CHANNEL ESTIMATE (72) | $\hat{H}'(n) = \hat{H}'(n-1) + (1-\theta)^2 E(n)$ |
| FUTURE CHANNEL ESTIMATE (73) | $\hat{H}(n+1\|n) = \hat{H}(n\|n-1) + \hat{H}'(n) + (1-\theta^2)E(n)$ |

| | FUNCTION | TIME INDEX | DESCRIPTION |
|---|---|---|---|
| 51 | RESET ESTIMATORS TO ZERO | $n = -14$ | SET $\hat{H}(n) = 0$ and $\hat{H}'(n) = 0$ |
| 52 | TRAIN CHANNEL ESTIMATE | $-14 < n < -7$ | UPDATE ESTIMATORS WITH MODIFIED EQUATIONS<br>56 → $\hat{H}'(n) = \hat{H}(n-1) + 4(1-\theta)^2 E(n)$<br>57 → $\hat{H}(n+1\|n) = \hat{H}(n\|n-1) + \hat{H}'(n) + 2(1-\theta^2)E(n)$ |
| 53 | RESET PREDICTOR TO ZERO | $n = -7$ | SET $\hat{H}'(n) = 0$ |
| 54 | TRAIN PREDICTOR | $-7 < n < 0$ | UPDATE ESTIMATORS WITH MODIFIED EQUATIONS<br>58 → $\hat{H}'(n) = \hat{H}(n-1) + 2(1-\theta)^2 E(n)$<br>59 → $\hat{H}(n+1\|n) = \hat{H}(n\|n-1) + \hat{H}'(n) + (1-\theta^2)E(n)$ |
| 55 | BEGIN TRACKING | $n = 0$ | UPDATE ESTIMATORS WITH STANDARD EQUATIONS |

CHANNEL ESTIMATOR AND METHOD THEREFOR

BACKGROUND OF THE INVENTION

1. Field of the Invention

The present invention relates generally to channel estimators for use in radio communication devices, such as radiotelephones and, more particularly, relates to a method and apparatus for initializing a channel estimator. In a preferred embodiment described herein, the channel estimator is a predictive least mean squares channel estimator.

2. Description of the Related Art

Adaptive channel estimators track the channel impulse response, represented by H(n), using received channel samples and symbols decoded by a detector such as an Ungerboeck Maximum Likelihood Sequence Estimator (MLSE). In Time Division Multiplex (TDM) systems such as the North American Digital Cellular (NADC) system, there is a synchronous codeword at the beginning of each frame of data. Typically the synchronous codeword is used to initialize an adaptive channel estimator. Two conventional approaches used to initialize the adaptive channel estimator are channel sounding, described with reference to FIG. 1, and training using the synchronous codeword, described with reference to FIG. 2.

Figure 1:
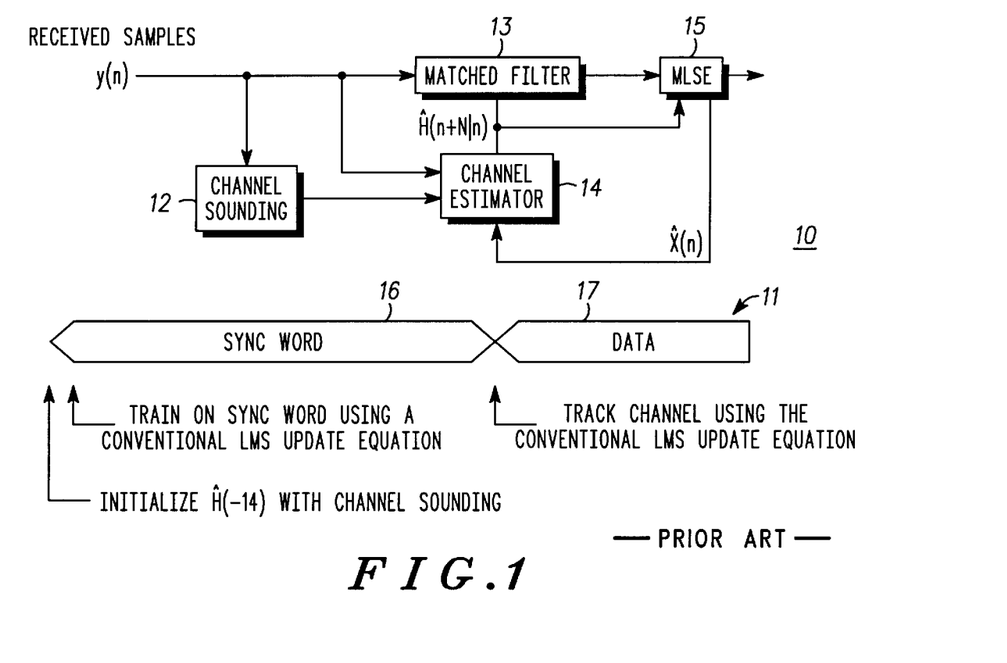
FIG. 1 illustrates a block diagram of an equalizer and a corresponding data stream using channel sounding followed by training to perform channel initialization, in accordance with the prior art.

FIG. 1 illustrates a block diagram of an equalizer 10 and a corresponding data stream 11 using channel sounding followed by training to perform channel initialization, in accordance with the prior art. The equalizer 10 generally includes a channel sounding block 12, a matched filter 13, a channel estimator 14 and a maximum likelihood sequence estimator (MLSE) 15. The data stream 11 represents the samples received by the equalizer 10 and generally includes a synchronous codeword 16 followed by data 17, as is well known in the art. The operation of the equalizer 10 responsive to receiving the data stream 11 is well known in the art. The channel sounding approach requires multiple complex correlations of received in-phase (I) and quadrature-phase (Q) samples with the synchronous codeword to produce an initial channel estimate H (0), as is well known in the art.

Figure 2:
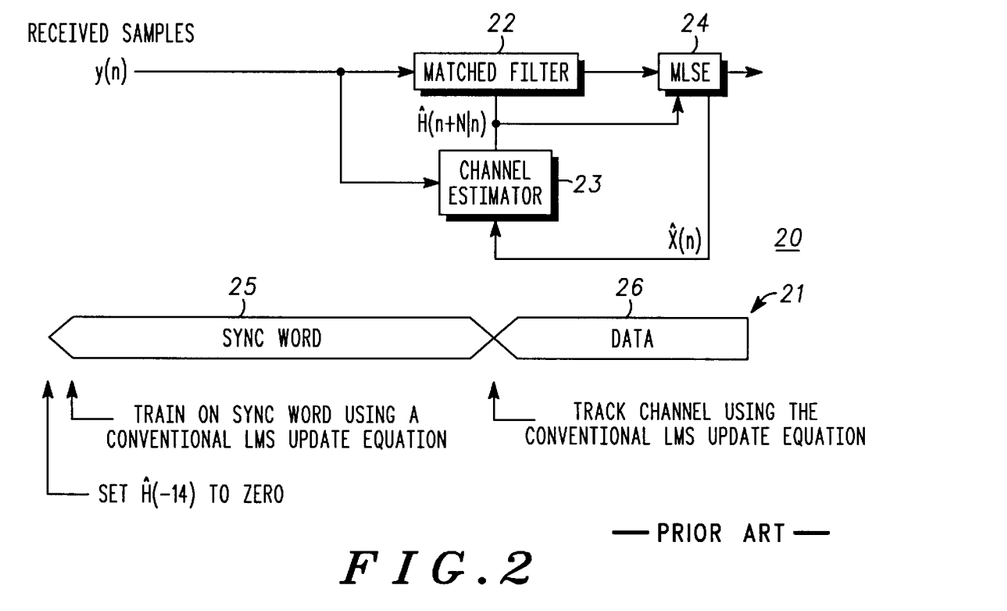
FIG. 2 illustrates a block diagram of an equalizer and a corresponding data stream using training to perform channel initialization, in accordance with the prior art.

FIG. 2 illustrates a block diagram of an equalizer 20 and a corresponding data stream 21 using training to perform channel initialization, in accordance with the prior art. The equalizer 20 generally includes a matched filter 22, a channel estimator 23 and a maximum likelihood sequence estimator (MLSE) 24. The data stream 21 represents the samples received by the equalizer 20 and generally includes a synchronous codeword 25 followed by data 26, as is well known in the art. The operation of the equalizer 20 responsive to receiving the data stream 21 is well known in the art. To perform channel initialization via the training approach, as illustrated in FIG. 2, the channel pulse response, $\hat{H}$ (−14), is set to an arbitrary constant (e.g. the all-zero vector) and the channel estimator is operated using the known symbols of the synchronous codeword 25. The goal is to have the channel estimator 23 converge to the actual channel response by the time data 26 is input to the channel estimator 23 at time n=0.

Each of these approaches has its drawbacks, especially when the channel estimator 14 in FIG. 1 or the channel estimator 23 in FIG. 2 is a predictive Least Mean Squares (LMS) adaptive filter. The LMS adaptive filter has essentially two estimators: one estimator for the channel response (i.e. the LMS estimator), and one estimator for the rate of change of the channel response (i.e. the predictor estimator). Each of these estimators must be initialized at the beginning of each frame.

In light of these two conventional approaches, conventional channel sounding alone is a sub-optimal technique of initialization because it initializes the LMS estimator but not the predictor estimator. Training alone, as described with FIG. 2, is a sub-optimal technique because training the LMS estimator (from a constant zero) tends to incorrectly train the predictor estimator, and there are not enough symbols in the synchronous codeword to compensate for this with conventional training. Further, channel sounding followed by training, as described with FIG. 1, helps somewhat, but this solution requires excessive hardware and current drain. For example, even if channel sounding followed by training was accomplished with a significant amount of hardware reuse, channel sounding would still require about 25,000 gates. Accordingly, there is a need for a method for initializing a predictive least mean squares channel estimator that solves the problem of initializing the LMS estimator and the predictor estimator to improve performance while minimizing hardware and current drain.

DETAILED DESCRIPTION OF A PREFERRED EMBODIMENT

Figure 3:
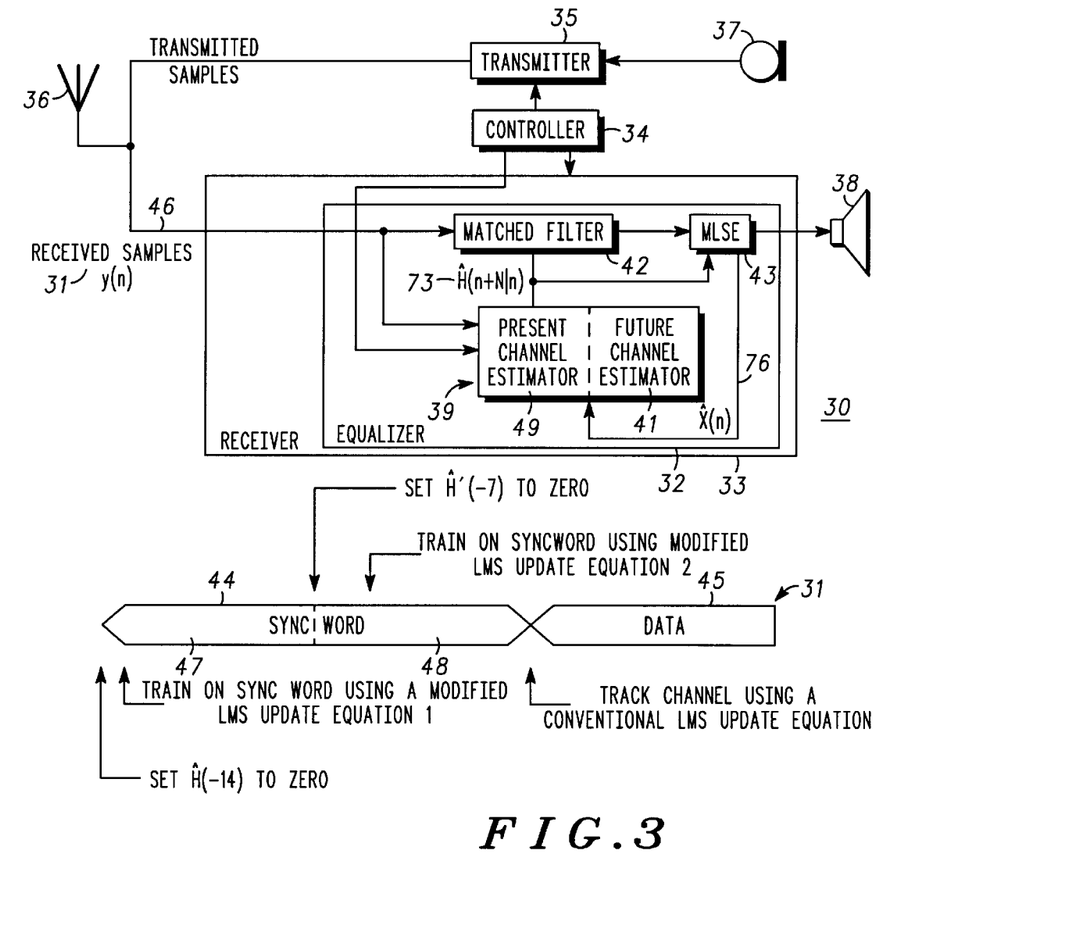
FIG. 3 illustrates a block diagram of radiotelephone including an equalizer having a predictive least mean squares channel estimator and illustrates a corresponding data stream using multiple training algorithms at multiple corresponding points within a synchrohous codeword to perform channel initialization, in accordance with a preferred embodiment of the present invention.

FIG. 3 illustrates a block diagram of radiotelephone 30 including an equalizer 32 having a predictive least mean squares channel estimator 39 and illustrates a corresponding data stream 31 using multiple training algorithms at multiple corresponding points within a synchronous codeword to perform channel initialization, in accordance with a preferred embodiment of the present invention. The radiotelephone 30 generally includes a receiver 33, a controller 34, a transmitter 35, an antenna 36, a microphone 37 and a speaker 38. The receiver 33 includes an equalizer 32, which includes a channel estimator 39, having a present channel estimator 49 and a future channel estimator 41, a matched filter 42 and a MLSE 43.

The data stream 31 generally includes a synchronous codeword 44 followed by a data stream 45, as is well known in the art. In the preferred embodiment, the data stream 31 represents a time division multiple access (TDMA) data stream in accordance with the United States Digital Cellular (USDC) Standard, IS-136. In the preferred embodiment, the radiotelephone 30 is adapted to transmit and receive TDMA signals in accordance with the USDC Standard, IS-136. The general operation of the radiotelephone 30 when receiving the data stream 31, except for a method and apparatus for initializing the predictive least mean squares channel estimator 39, is well known in the art. The preferred embodiment of the present invention is directed to an improved method and apparatus for initializing the predictive least mean squares channel estimator 39.

Figure 4:
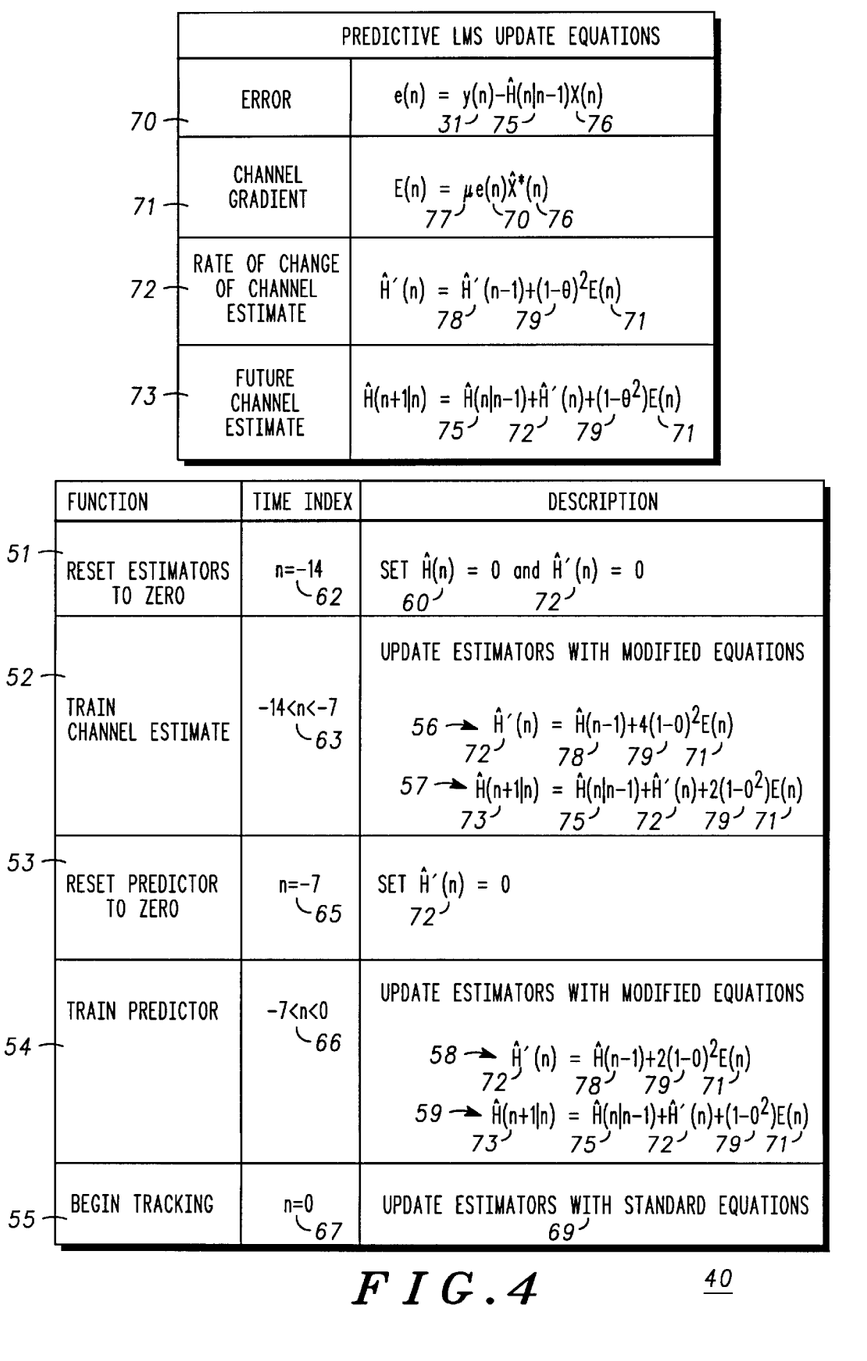
FIG. 4 is a table illustrating a method and an apparatus for initializing the equalizer having the predictive least mean squares channel estimator shown in FIG. 3, in accordance with a preferred embodiment of the present invention.

FIG. 4 is a table 40 illustrating a method and an apparatus for initializing the equalizer 32 having the predictive least mean squares channel estimator 39, as shown in FIG. 3, in accordance with a preferred embodiment of the present invention. In the preferred embodiment of the present invention, the table 40 is implemented in hardware in the controller 34 and the channel estimator 39 in the radiotelephone 30 of FIG. 3. Alternatively, the table 40 may be implemented in software in the controller 34 and the channel estimator 39 in the radiotelephone 30 of FIG. 3.

The preferred embodiment of the present invention provides a method and apparatus for initializing a predictive Least Mean Squares (LMS) channel estimator 39 which uses the predictive LMS channel estimator and the controller 34 to initialize the LMS channel estimate and the predictor estimate at the beginning of each frame of data in a TDMA information signal. The four update equations for the predictive LMS channel estimator are shown in FIG. 4. The error signal 70 is calculated responsive to the received samples 31, a channel estimate over past samples 75 and an estimate of the decoded symbols 76. The channel gradient 71 is calculated responsive to an adaptation coefficient 77, the error signal 70 and a complex conjugate of the estimate of the decoded symbols 76. A rate of change of the present channel estimate 72 is calculated responsive to a rate of change of a past channel estimate 78, a predictor update coefficient 79 and the channel gradient 71. The future channel estimate 73 is calculated responsive to a past channel estimate 75, the rate of change of the channel estimate 72, the predictor update coefficient 79 and the channel gradient 71.

In the preferred embodiment of the present invention, time n=0 will refer to the time when the first data symbol is received by the predictive LMS channel estimator 39 and time n=−14 corresponds to the beginning of the synchronous codeword 44. The goal of the initialization process is to initialize the LMS channel estimate and the predictor by time n=0 when the first data symbol is received.

The channel estimator comprises an input terminal 46, an initialization circuit and an update circuit. The initialization circuit and the update circuit are implemented in the channel estimator 39. Alternatively, the initialization circuit and the update circuit may be implemented in whole or in part in the controller 34.

The input terminal 46 receives an information signal 31 having a plurality of sequential symbols including a first plurality of sequential symbols forming a synchronous codeword 44 and a second plurality of sequential symbols forming a data sequence 45. The first plurality of sequential symbols forming the synchronous codeword 44 includes a first subset of sequential symbols 47 and a second subset of sequential symbols 48.

The initialization circuit initializes 51 a present channel estimate 60 of the channel estimator 39 and a rate of change of the present channel estimate 72 of the channel estimator 39 to a predetermined value at a symbol 62 in the first subset of sequential symbols 47 within the synchronous codeword 44.

The update circuit updates 52 a future channel estimate 73 of the channel estimator 39 and the rate of change of the present channel estimate 72 of the channel estimator 39 over symbols 63 in the first subset of sequential symbols 47 within the synchronous codeword 44 responsive to a first future channel estimate algorithm 57 and a first rate of change of a present channel estimate algorithm 56, respectively, to cause a present channel estimate of the channel estimator 39 to reach a steady state condition.

The initialization circuit initializes 53 a rate of change of the future channel estimate 72 of the channel estimator 39 to a predetermined value at a symbol 65 in the second subset of sequential symbols 48 within the synchronous codeword 44.

The update circuit updates 54 the future channel estimate 73 of the channel estimator 39 and the rate of change of the channel estimate 72 of the channel estimator 39 over symbols 66 in the second subset of sequential symbols 48 within the synchronous codeword 44 responsive to a second future channel estimate algorithm 59 and a second rate of change of the present channel estimate algorithm 58, respectively, to improve a future accuracy of the channel estimator 39.

The update circuit updates 55 the future channel estimate 73 of the channel estimator 39 and the rate of change of the present channel estimate 72 of the channel estimator 39 over symbols 67 in the second plurality of sequential symbols forming the data sequence 45 responsive to a third future channel estimate algorithm and a third rate of change of the present channel estimate algorithm, respectively, to determine the channel estimate of the channel estimator 39 over the data sequence 45 without substantially affecting the steady state condition of the present channel estimate or the future accuracy of the channel estimator 39. In the preferred embodiment of the present invention, the third future channel estimate algorithm and the third rate of change of the present channel estimate algorithm are implemented using conventional equations.

In the preferred embodiment of the present invention, a present channel estimator 49 produces the present channel estimate and a future channel estimator 41 produces the future channel estimate. The present channel estimator 49 and the future channel estimator 41 are part of the channel estimator 39.

Preferably, the first plurality of sequential symbols, forming the synchronous codeword 44, is sequentially followed by the second plurality of sequential symbols forming the data sequence 45. Alternatively, the first plurality of sequential symbols, forming the synchronous codeword 44, may be sequentially preceded by the second plurality of sequential symbols forming the data sequence 45.

In the preferred embodiment of the present invention, the first subset of sequential symbols 47 is sequentially followed by the second subset of sequential symbols 48. Alternatively, the first subset of sequential symbols 47 may be sequentially preceded by the second subset of sequential symbols 48.

Preferably, the initialization circuit initializes 51 the present channel estimate by setting the present channel estimate 60 of the channel estimator 39 and the rate of change of the present channel estimate 72 of the channel estimator 39 substantially equal to zero at the symbol 62 in the first subset of sequential symbols 47 within the synchronous codeword 44. Alternatively, values other than zero may be used to achieve a desired result.

In the preferred embodiment of the present invention, the first future channel estimate algorithm 57 is responsive to a present channel estimate 75 and the rate of change of the present channel estimate 72.

Preferably, the initialization circuit initializes 53 the rate of change of the future channel estimate 72 of the channel estimator 39 by setting the rate of change of the future channel estimate 72 of the future channel estimator 41 substantially equal to zero at the symbol 65 in the second subset of sequential symbols 48 within the synchronous codeword 44. Alternatively, values other than zero may be used to achieve a desired result.

In the preferred embodiment of the present invention, the channel estimator 39 is a predictive least mean square (LMS) channel estimator, and the information signal 31 is a time division multiple access (TDMA) signal. Alternatively, the present invention is not limited to the preferred predictive LMS channel estimator, but may be used with any system using an adaptive MLSE equalizer. Further, the present invention is not limited to a TDMA signal, but may be used with any system requiring the initialization of a channel estimator. Such alternative system may include the Global System Mobile (GSM) cellular standard.

Preferably, the first 57, second 59 and third future channel estimate algorithms are represented by first, second and third sets of coefficients for a future channel estimate equation, respectively, and the first 56, second 58 and third rate of change of the present channel estimate algorithms are represented by first, second and third sets of coefficients for a rate of change of a present channel estimate equation, respectively. In the preferred embodiment of the present invention, the coefficients are optimized for a hardware implementation.

In the preferred embodiment of the present invention, the first 57 and second 59 future channel estimate equations are responsive to the present channel estimate 75 and the rate of change of the present channel estimate 72.

In the preferred embodiment of the present invention, the rate of change of the present channel estimate equation 72 is responsive to a rate of change of a past channel estimate 78 and a channel gradient estimate 71.

Preferably, the channel estimate of the channel estimator 39 reaches a steady state condition at a first rate of change responsive to the first set of coefficients for the future channel estimate equation 57 and the first set of coefficients for a rate of change of the present channel estimate equation 56. In the preferred embodiment of the present invention, the coefficients effecting the first rate of change are optimized for a hardware implementation.

In the preferred embodiment of the present invention, the channel estimate of the channel estimator 39 improves an accuracy of the future channel estimator 41 at a second rate of change, slower than the first rate of change, without substantially affecting the steady state condition of the channel estimate. The second rate of change is responsive to the second set of coefficients for the future channel estimate equation 59 and the second set of coefficients for a rate of change of the present channel estimate equation 58. In the preferred embodiment of the present invention, the coefficients effecting the first rate of change are optimized for a hardware implementation.

Preferably, the channel estimate of the channel estimator 39 is determined over the data sequence 45 at a third rate of change, slower than the second rate of change, without substantially affecting the steady state condition of the channel estimate or the accuracy of the future channel estimator. The third rate of change is responsive to the third set of coefficients for the future channel estimate equation and the third set of coefficients for a rate of change of the present channel estimate equation. In the preferred embodiment of the present invention, the coefficients effecting the third rate of change are optimized for a hardware implementation.

In summary of the predictive least mean square (LMS) channel estimator 39 and method therefor, the input terminal 46 receives a time division multiple access (TDMA) information signal 31 having a plurality of sequential symbols. The TDMA information signal 31 includes a first plurality of sequential symbols forming a synchronous codeword 44 followed by a second plurality of sequential symbols forming a data sequence 45. The first plurality of sequential symbols forming the synchronous codeword 44 includes a first subset of sequential symbols 47 having seven symbols beginning with a first symbol sequentially followed by a second subset of sequential symbols 48 having seven symbols beginning with a first symbol.

The initialization circuit sets 51 a present channel estimate 60 of a present channel estimator 39 and a rate of change of the present channel estimate 72 of the present channel estimator 39 substantially equal to zero at the first symbol 62 of the seven symbols in the first subset of sequential symbols 47 within the synchronous codeword 44. Therefore, the value of the estimators 60 and 72 are reset to zero.

The update circuit updates 52 a future channel estimate 73 of a future channel estimator 41 and the rate of change of the present channel estimate 72 of the present channel estimator 49 over the seven symbols 63 in the first subset of sequential symbols 47 within the synchronous codeword 44 responsive to a first set of coefficients for a future channel estimate equation 57 and a first set of coefficients for a rate of change of a present channel estimate equation 56, respectively, to cause a present channel estimate 75 of the present channel estimator 49 to reach a steady state condition at a first rate of change. The future channel estimate equation 57 is responsive to the present channel estimate 75 and the rate of change of the present channel estimate 72. The rate of change of the present channel estimate equation 56 is responsive to a rate of change of a past channel estimate 78 and a channel gradient estimate 71. The first rate of change is responsive to the first set of coefficients for the future channel estimate equation 57 and the first set of coefficients for the rate of change of the present channel estimate equation 56. Therefore, the channel estimator 39 uses the first half of the synchronous codeword to train the channel estimate.

The initialization circuit sets 53 a rate of change of the future channel estimate 72 of the future channel estimator 41 substantially equal to zero at the first symbol 65 of the seven symbols in the second subset of sequential symbols 48 within the synchronous codeword 44. Therefore, the value of the estimator 72 is reset to zero. The predictor must be reset to zero at n=−7 because the magnitude of the predictor is typically larger than its optimal value due to prior training of the channel estimate.

The update circuit updates 54 the future channel estimate 73 of the future channel estimator 41 and the rate of change of the present channel estimate 72 of the present channel estimator 49 over the seven symbols 66 in the second subset of sequential symbols 48 within the synchronous codeword 44 responsive to a second set of coefficients for the future channel estimate equation 59 and a second set of coefficients for the rate of change of the present channel estimate equation 58, respectively, to improve an accuracy of the future channel estimator 41 at a second rate of change, slower than the first rate of change, without substantially affecting the steady state condition of the channel estimate. The second rate of change is responsive to the second set of coefficients for the future channel estimate equation 59 and the second set of coefficients for the rate of change of the present channel estimate equation 58. Therefore, the channel estimator 39 uses the second half of the synchronous codeword to train the predictor.

The update circuit updates 55, or tracks, the future channel estimate of the future channel estimator 41 and the rate of change of the present channel estimate of the present channel estimator 49 over symbols 67 in the second plurality of sequential symbols forming the data sequence 45 responsive to a third first set of coefficients for the future channel estimate equation and a third first set of coefficients for the rate of change of the present channel estimate equation, respectively, to determine the channel estimate of the channel estimator over the data sequence 45 at a third rate of change, slower than the second rate of change, without substantially affecting the steady state condition of the channel estimate or the accuracy of the future channel estimator 41. The third rate of change is responsive to the third set of coefficients for the future channel estimate equation and the third set of coefficients for the rate of change of the present channel estimate equation. Therefore, the channel estimator 39 tracks the channel estimate over the data sequence 45.

Essentially, the improved channel estimator 39 uses the first half of the synchronous codeword to train the channel estimate and the second half to train the predictor. Fast training is facilitated by changing the coefficients of the update equations 56, 57, 58, 59 and 69. A channel estimator using the disclosed method and apparatus for initialization advantageously has a lower current drain, is uses less hardware gates and has a lower cost than conventional channel estimators. When the preferred channel estimator 39 is implemented into a portable radiotelephone, these advantages enable the portable radiotelephone to have a longer battery life, to be made smaller, and to cost less than portable radiotelephones using conventional channel estimators. The preferred channel estimator 39 is an especially attractive solution for hardware implementation because it reuses the hardware of the predictive LMS, thereby eliminating the need for additional circuitry to perform channel sounding. The scaling of the coefficients in the update equations to increase the processing speed is similarly well-suited for hardware. For example, the scaling by 2 and 4, in equations 58 and 56, respectively, is accomplished by 1 and 2 bit left-shifts respectively. Therefore, in the preferred embodiment of the present invention, the combination of training, by initializing and updating, the predictive LMS channel estimator over multiple portions of the synchronous codeword, resetting the estimators 60 and 72, and scaling the update coefficients of the equations 56, 57, 58, 59 and 69 contributes to the improvement over known technology.

Figure 5:
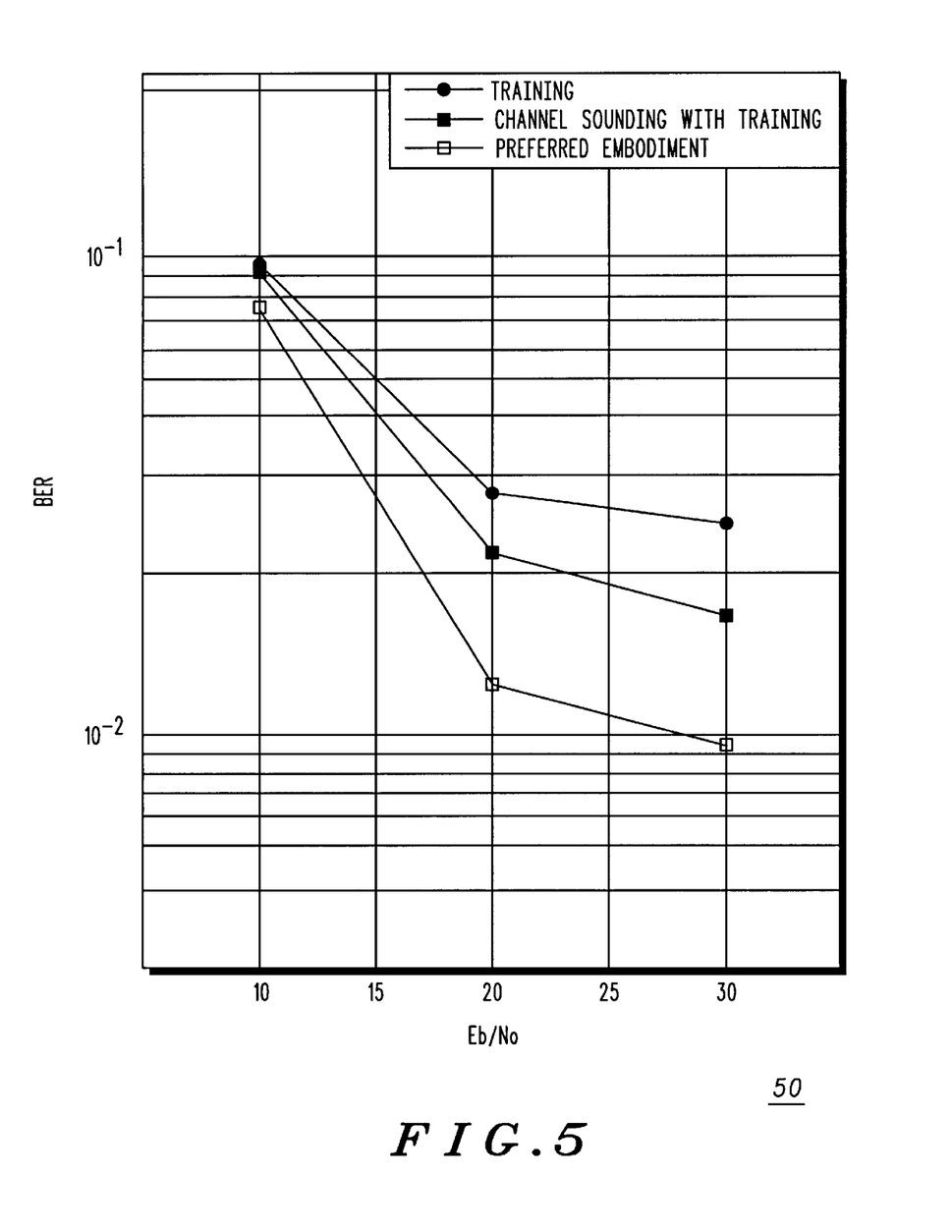
FIG. 5 is a graph comparing the performance of the prior art equalizer shown in FIG. 1, the prior art equalizer shown in FIG. 2, and the equalizer having the predictive least mean squares channel estimator of the preferred embodiment, as shown in FIGS. 3 and 4.

FIG. 5 is a graph 50 comparing the performance of the prior art equalizer 10 shown in FIG. 1, the prior art equalizer 20 shown in FIG. 2, and the equalizer 30 having the predictive least mean squares channel estimator 39 of the preferred embodiment, as shown in FIGS. 3 and 4. The graph 50 compares channel initialization performance as a signal (Eb) to noise (No) ratio (Eb/No) versus bit error rate (BER), at Fd=80 Hz and at a one symbol delay spread. The equalizer 32 used averaged correlator clock recovery, the channel estimator 39 having four, T/2 spaced taps, the matched filter 42 and the Ungerboeck MLSE 43 having two states. The performance of the prior art equalizer 10, shown in FIG. 1, is represented by the solid black square, as channel sounding with training. The performance of the prior art equalizer 20, shown in FIG. 2, is represented by the solid black circle, as training. The performance of the equalizer 30 having the predictive least mean squares channel estimator 39 of the preferred embodiment, as shown in FIGS. 3 and 4, is represented by the outlined black square. The graph 50 shows the performance of the equalizer 30 having the predictive least mean squares channel estimator 39 of the preferred embodiment producing a 2.5 dB improvement over the known technology at the USDC specification point of 3% BER at 20 dB Eb/No.

In the preferred embodiment of the present invention, the gate count in a hardware implementation is reduced by 2,500 gates from 25,000 to effect a 10% reduction in hardware. The 10% reduction in hardware translates into a reduction in the cost of implementing the hardware and also translates into a reduction in the current drain required by the hardware. In addition, the BER performance is improved as much as 2.5 dB. The present invention is not limited to the preferred predictive LMS channel estimator and TDMA signaling, but may be used with any signaling system using an adaptive MLSE equalizer. Thus, the present invention provides a particularly attractive solution for modem circuits integrated on a single integrated circuit where hardware gate count reduction becomes an important variable to achieving a low cost and a low current drain design while improving performance.

While the present invention has been described with reference to various illustrative embodiments thereof, the present invention is not intended that the invention be limited to these specific embodiments. Those skilled in the art will recognize that variations and modifications can be made without departing from the spirit and scope of the invention as set forth in the appended claims.

What is claimed is:

1. A method for operating a channel estimator comprising the steps of:

receiving by the channel estimator an information signal having a plurality of sequential symbols including a first plurality of sequential symbols forming a synchronous codeword and a second plurality of sequential symbols forming a data sequence, the first plurality of sequential symbols forming the synchronous codeword includes a first subset of sequential symbols and a second subset of sequential symbols;

initializing a present channel estimate of the channel estimator and a rate of change of the present channel estimate of the channel estimator to a predetermined value at a symbol in the first subset of sequential symbols within the synchronous codeword;

updating a future channel estimate of the channel estimator and the rate of change of the present channel estimate of the channel estimator over symbols in the first subset of sequential symbols within the synchronous codeword responsive to a first future channel estimate algorithm and a first rate of change of a present channel estimate algorithm, respectively, to cause the present channel estimate of the channel estimator to reach a steady state condition;

initializing a rate of change of the future channel estimate of the channel estimator to a predetermined value at a symbol in the second subset of sequential symbols within the synchronous codeword;

updating the future channel estimate of the channel estimator and the rate of change of the present channel estimate of the channel estimator over symbols in the second subset of sequential symbols within the synchronous codeword responsive to a second future channel estimate algorithm and a second rate of change of the present channel estimate algorithm, respectively, to improve a future accuracy of the channel estimator; and updating the future channel estimate of the channel estimator and the rate of change of the present channel estimate of the channel estimator over symbols in the second plurality of sequential symbols forming the data sequence responsive to a third future channel estimate algorithm and a third rate of change of the present channel estimate algorithm, respectively, to determine the present channel estimate of the channel estimator over the data sequence without substantially affecting the steady state condition of the present channel estimate or the future accuracy of the channel estimator.

2. The method according to claim 1, wherein the present channel estimate is produced by a present channel estimator, and wherein the future channel estimate is produced by a future channel estimator.

3. The method according to claim 1, wherein the first plurality of sequential symbols forming the synchronous codeword is sequentially followed by the second plurality of sequential symbols forming the data sequence.

4. The method according to claim 1, wherein the first subset of sequential symbols is sequentially followed by the second subset of sequential symbols.

5. The method according to claim 1, wherein the step of initializing the present channel estimate further comprises the step of:

setting the present channel estimate of the channel estimator and the rate of change of the present channel estimate of the channel estimator substantially equal to zero at the symbol in the first subset of sequential symbols within the synchronous codeword.

6. The method according to claim 1, wherein the first future channel estimate algorithm is responsive to the present channel estimate and the rate of change of the present channel estimate.

7. The method according to claim 1, wherein the step of initializing the rate of change of the future channel estimate of the channel estimator further comprises the step of:

setting the rate of change of the future channel estimate of the channel estimator substantially equal to zero at the symbol in the second subset of sequential symbols within the synchronous codeword.

8. The method according to claim 1, wherein the channel estimator further comprises a predictive least mean square (LMS) channel estimator, and wherein the information signal is a time division multiple access (TDMA) signal.

9. The method according to claim 1, wherein the first, second and third future channel estimate algorithms are represented by first, second and third terms in a future channel estimate equation, respectively, and wherein the first, second and third rate of change of the present channel estimate algorithms are represented by first, second and third terms in a rate of change of a present channel estimate equation, respectively.

10. The method according to claim 9, wherein the first and second future channel estimate equations are responsive to the present channel estimate and the rate of change of the present channel estimate.

11. The method according to claim 9, wherein the rate of change of the present channel estimate equation is responsive to a rate of change of a past channel estimate and a channel gradient estimate.

12. The method according to claim 9, wherein the present channel estimate of the channel estimator reaches the steady state condition at the first rate of change responsive to the first set of coefficients for the future channel estimate equation and the first set of coefficients for a rate of change of the present channel estimate equation.

13. The method according to claim 12, wherein the future channel estimate of the channel estimator improves the future accuracy of the channel estimator at the second rate of change, slower than the first rate of change, without substantially affecting the steady state condition of the present channel estimate, and wherein the second rate of change is responsive to the second set of coefficients for the future channel estimate equation and the second set of coefficients for the rate of change of the present channel estimate equation.

14. A channel estimator comprising:

an input terminal for receiving an information signal having a plurality of sequential symbols, the plurality of sequential symbols including a first plurality of sequential symbols forming a synchronous codeword and a second plurality of sequential symbols forming a data sequence, and the synchronous codeword including a first subset of sequential symbols and a second subset of sequential symbols;

an initialization circuit for initializing a present channel estimate of the channel estimator and a rate of change of the present channel estimate of the channel estimator to a predetermined value at a symbol in the first subset of sequential symbols within the synchronous codeword; and an update circuit for updating a future channel estimate of the channel estimator and the rate of change of the present channel estimate of the channel estimator over symbols in the first subset of sequential symbols within the synchronous codeword, the update circuit updating the future channel estimate responsive to a first future channel estimate algorithm, and the update circuit also updating the rate of change of the present channel estimate responsive to a first rate of change of a present channel estimate algorithm, to cause the present channel estimate of the channel estimator to reach a steady state condition.

15. The channel estimator according to claim 14, wherein the initialization circuit initializes a rate of change of the future channel estimate of the channel estimator to a predetermined value at a symbol in the second subset of sequential symbols within the synchronous codeword.

16. The channel estimator according to claim 15, wherein the update circuit updates the future channel estimate of the channel estimator and the rate of change of the present channel estimate of the channel estimator over symbols in the second subset of sequential symbols within the synchronous codeword responsive to a second future channel estimate algorithm and a second rate of change of the present channel estimate algorithm, respectively, to improve a future accuracy of the channel estimator.

17. The channel estimator according to claim 16, wherein the update circuit updates the future channel estimate of the channel estimator and the rate of change of the present channel estimate of the channel estimator over symbols in the second plurality of sequential symbols forming the data sequence responsive to a third future channel estimate algorithm and a third rate of change of the present channel estimate algorithm, respectively, to determine the future channel estimate of the channel estimator over the data sequence without substantially affecting the steady state condition of the present channel estimate or the future accuracy of the channel estimator.

18. The channel estimator according to claim 17, further comprising:
   a present channel estimator for producing the present channel estimate; and
   a future channel estimator for producing the future channel estimate.

19. The channel estimator according to claim 17, wherein the first plurality of sequential symbols forming the synchronous codeword is sequentially followed by the second plurality of sequential symbols forming the data sequence.

20. The channel estimator according to claim 17, wherein the first subset of sequential symbols is sequentially followed by the second subset of sequential symbols.

21. The channel estimator according to claim 17, wherein the initialization circuit initializes the present channel estimate by setting the present channel estimate of the channel estimator and the rate of change of the present channel estimate of the channel estimator substantially equal to zero at the symbol in the first subset of sequential symbols within the synchronous codeword.

22. The channel estimator according to claim 17, wherein the first future channel estimate algorithm is responsive to the present channel estimate and the rate of change of the present channel estimate.

23. The channel estimator according to claim 17, wherein the initialization circuit initializes the rate of change of the future channel estimate of the channel estimator by setting the rate of change of the future channel estimate of the future channel estimator substantially equal to zero at the symbol in the second subset of sequential symbols within the synchronous codeword.

24. The channel estimator according to claim 17,
   wherein the channel estimator further comprises a predictive least mean square channel estimator, and
   wherein the information signal is a time division multiple access signal.

25. The channel estimator according to claim 17,
   wherein the first, second and third future channel estimate algorithms are represented by first, second and third sets of terms in a future channel estimate equation, respectively, and
   wherein the first, second and third rate of change of the present channel estimate algorithms are represented by first, second and third terms in a rate of change of a present channel estimate equation, respectively.

26. The channel estimator according to claim 25, wherein, the first and second future channel estimate algorithms are responsive to the present channel estimate and the rate of change of the present channel estimate.

27. The channel estimator according to claim 25, wherein the rate of change of the present channel estimate equation is responsive to a rate of change of a past channel estimate and a channel gradient estimate.

28. The channel estimator according to claim 25, wherein the future channel estimate of the channel estimator reaches a steady state condition at a first rate of change responsive to the first set of coefficients for the future channel estimate equation and the first set of coefficients for a rate of change of the present channel estimate equation.

29. The channel estimator according to claim 28, wherein the future channel estimate of the channel estimator improves an accuracy of the future channel estimate equation at a the second rate of change, slower than the first rate of change, without substantially affecting the steady state condition of the channel estimate, and wherein the second rate of change is responsive to the second set of coefficients for the future channel estimate equation and the second set of coefficients for a rate of change of the present channel estimate equation.

30. The channel estimator according to claim 29, wherein the future channel estimate of the channel estimator is determined over the data sequence at a third rate of change, slower than the second rate of change, without substantially affecting the steady state condition of the channel estimate or the accuracy of the future channel estimator, wherein the third rate of change is responsive to the third set of coefficients for the future channel estimate equation and the third set of coefficients for a rate of change of the present channel estimate equation.

31. A receiver configured to receive a first plurality of sequential symbols forming a synchronous codeword and a second plurality of sequential symbols forming a data sequence, the receiver comprising:
   a present channel estimator coupled to the receiver, the present channel estimator configured to produce a present channel estimate;
   a future channel estimator coupled to the receiver, the future channel estimator configured to produce a future channel estimate; and
   an initialization circuit coupled to the present channel estimator, the initialization circuit configured to initialize a present channel estimate by setting the present channel estimate and a rate of change of the present channel estimate substantially equal to a predefined value at a symbol in a first subset of sequential symbols,
   wherein the first plurality of sequential symbols comprises the first subset of sequential symbols and a second subset of sequential symbols.

32. The receiver according to claim 31, wherein the future channel estimator includes a future channel estimate algorithm responsive to the present channel estimate and the rate of change of the present channel estimate.

33. The receiver according to claim 31, further comprising a Maximum Likelihood Sequence Estimator.

34. A channel estimator comprising:
   an initialization circuit configured with an initialization algorithm to initialize a present channel estimate of the channel estimator and a rate of change of the present channel of the channel estimator to a predetermined value at a symbol in a first subset of sequential symbols within a synchronous codeword; and
   an update circuit including
   a rate of change of channel estimate algorithm for updating the rate of change of the present channel estimate of the channel estimator over symbols in the first subset of sequential symbols within the synchronous codeword, and
   a future channel estimate algorithm for updating a future channel estimate of the channel estimator and over symbols in the first subset of sequential symbols within the synchronous codeword.

* * * * *